Nov. 13, 1962
M. FREY
3,063,725
SHAFT SEAL
Filed Feb. 26, 1959
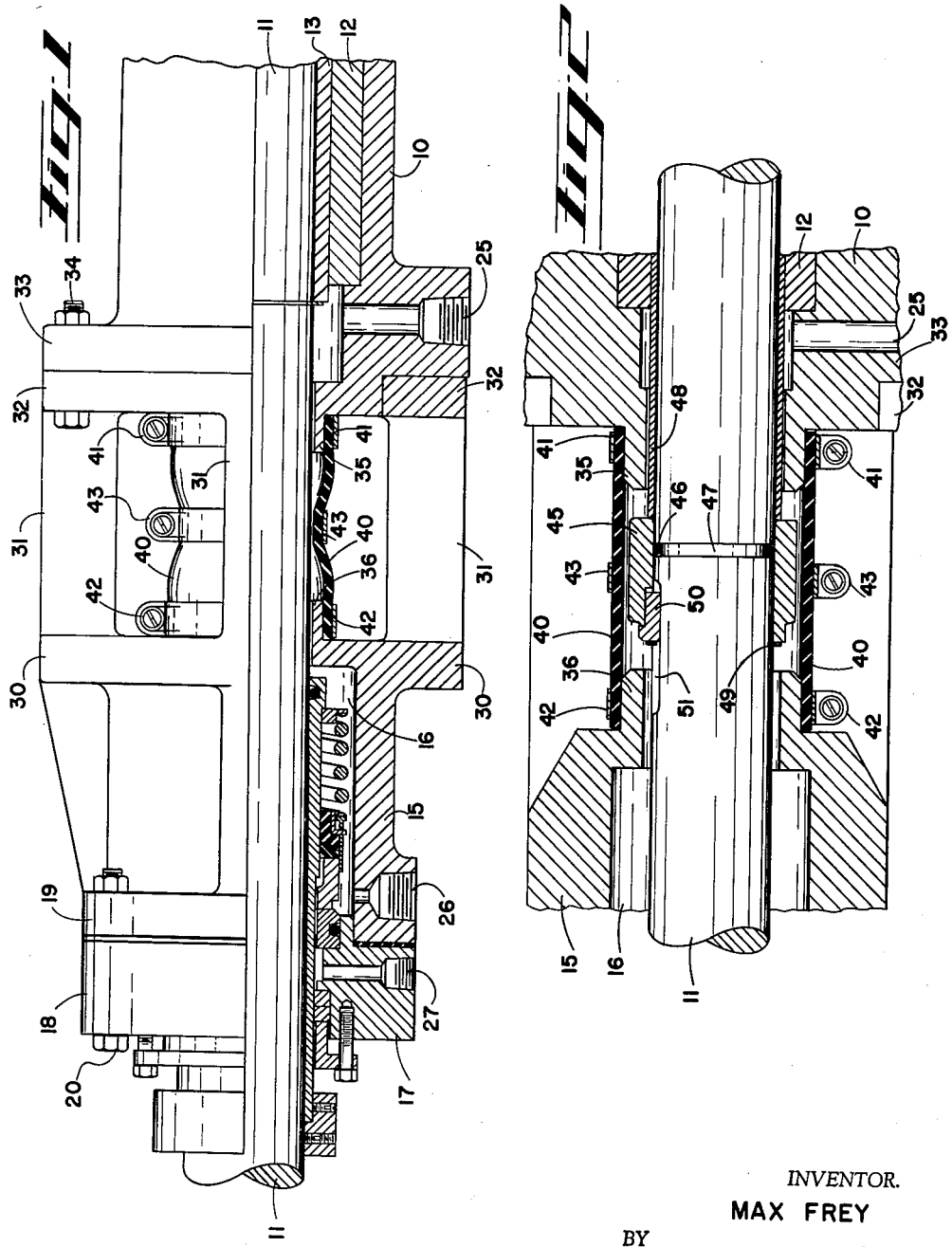
INVENTOR.
MAX FREY
BY
*C. R. Schermerhorn*
ATTORNEY

United States Patent Office 3,063,725
Patented Nov. 13, 1962

3,063,725
SHAFT SEAL
Max Frey, Portland, Oreg., assignor to Guy F. Atkinson Company, South San Francisco, Calif., a corporation of Nevada
Filed Feb. 26, 1959, Ser. No. 795,770
1 Claim. (Cl. 277—4)

This invention relates to a shaft seal and has particular reference to a temporary or auxiliary seal for use while a machine is shut down during repair or replacement of its normal running seal.

In pumps and other rotary machines handling corrosive or noxious liquids, gases or vapors, there exists the problem of preventing escape of such substances during repair of the shaft seal which normally accomplishes the sealing function while the machine is in operation. This is particularly true in equipment where the corrosive or noxious substance may be subject to some pressure above atmospheric even when the machine is shut down. In such machines, the shaft bearing itself may not be sufficiently tight to prevent escape of the substances as, for example, in the case of longitudinally grooved or segmented bearings which permit free fluid flow longitudinally through the bearing. In such machines, removal of the running seal permits the escape of liquid or gaseous substances which may be harmful to the workmen as well as being objectionable because of the loss of the substance. When the shaft seal is to be repaired in such a machine, it is generally necessary not only to relieve the static pressure on the corrosive or obnoxious fluid, but also, in many cases, to empty the machine and purge it of such fluid. This, of course, is to be avoided if possible because it not only takes the particular machine out of operation, but also may interfere with other operations associated with such machine.

It is, accordingly, an object of the present invention to provide a novel and improved form of shaft seal, to provide a seal especially arranged and adapted to seal a shaft opening in a housing while the shaft is stationary, to provide an auxiliary or temporary seal to seal the shaft opening while the permanent or running seal is being repaired and to provide a seal which may readily be tightened into sealing engagement with a shaft and loosened so as to be free of contact with the shaft when desired.

The present seal comprises a short length of flexible sleeve closely surrounding the shaft but normally out of contact therewith. One end of the sleeve is sealed to the machine or bearing housing and the other end is sealed to a seal chamber housing containing the running seal. When the machine is shut down for repair of the running seal, an intermediate portion of the sleeve is contracted or clamped into sealing engagement with the shaft. When the repair on the running seal is completed, the center clamp is released, allowing the sleeve to spring back out of contact with the shaft by its own resilience. During normal operation of the machine, the sleeve maintains a liquid and gas-tight connection between the machine or bearing housing and the seal chamber housing containing the running seal.

The foregoing and other objects and advantages will become apparent from the following detailed description of the embodiments shown on the accompanying drawing. Various changes may be made, however, in the construction and arrangement of parts and all such modifications within the scope of the appended claims are included in the invention.

In the drawing:
FIGURE 1 is a view half in side elevation and half in longitudinal section, showing a typical installation of a seal embodying the features of the invention; and
FIGURE 2 is a longitudinal section view of a modification.

In FIGURE 1, the numeral 10 designates the bearing housing on the end of a pump housing for supporting a pump impeller shaft, or the like, 11, in a bearing 12. The numeral 13 designates a conventional sleeve interposed between the shaft and bearing. As is common in such machines for certain purposes, the bearing 12 is of the longitudinally grooved or segmented type which permits any fluid under pressure in the machine housing connected with bearing housing 10 to escape along the shaft. The present pump is used in a system which maintains a static pressure in the pump housing even when the pump is shut down, whereby fluid may pass through the bearing at all times.

Numeral 15 designates a seal chamber housing having an annular seal chamber 16 around the shaft 11 outwardly from bearing 12. The left end of shaft 11 may be connected with a drive motor, not shown, while the right end is connected with a pump impeller in the pump housing. Housing 10 may be considered as part of the pump housing as well as a bearing housing. Numeral 17 designates a conventional cartridge-type mechanical seal with auxiliary packing which is equipped with a flange 18 secured to a flange 19 on the seal chamber housing by means of bolts 20. When bolts 20 are removed, the flange 18 may be separated from flange 19 to withdraw the entire cartridge seal unit from the seal chamber 16.

An external bearing and seal lubrication connection is provided at 25 and additional seal lubrication connections are provided at 26 in the seal chamber housing and 27 in the cartridge unit. To facilitate the replacement of such cartridge seal units, suitable provision is made for gaining access to the left end of shaft 11, preferably by disconnection of the usual coupling between the shaft and its drive motor. Such details are not illustrated and the specific construction of the cartridge seal unit 17 is not described since these details form no part of the present invention.

Seal chamber housing 15 has a radial end flange 30 with a plurality of struts 31 supported from an annular connecting ring 32. Ring 32 is mounted on a bearing housing radial end flange 33 by means of bolts 34. Radial bearing housing flange 33 is equipped with an axially projecting annular flange 35 closely surrounding shaft 11 and the end flange on the seal chamber housing is similarly equipped with an opposed axially extending annular flange 36 of the same size.

A flexible and resilient rubber or plastic hose 40 is clamped at its ends on the annular flanges 35 and 36 by a pair of hose clamps 41 and 42. A center clamp 43 is employed to contract the hose 40 into sealing engagement wtih the shaft when the machine is shut down for replacement of the cartridge seal 17. At such time any leakage through bearing 12 is stopped by the temporary seal afforded by hose 40. When cartridge seal 17 has been repaired, hose clamp 43 is loosened, allowing hose 40 to expand away from contact with the shaft so that there will be no drag or wear on the hose when the shaft is turning. At the same time the loosened clamp 43 prevents bulging of the hose under the operating pressure existing in the machine. Since the clamps 41, 42 and 43 need be spaced apart only a slight distance from each other, the hose will withstand substantial pressure if necessary.

The space between end flange 30 and ring 32 may be closed by a cylindrical dust cover clamped on the flange and ring, if desired.

FIGURE 2 illustrates a modification employing a shaft collar 45 to minimize deformation of the hose or sleeve 40 when the center clamp is tightened. Collar 45 is sealed to the shaft by a rubber O-ring 46 in a peripheral shaft groove 47 under the collar. One end of collar 45 abuts a metal shaft sleeve 48 and is held in such position by a retaining ring 49. The collar is keyed to the shaft by a key 50 in a shaft keyway 51 whereby the collar is rigidly connected with the shaft and constitutes merely an enlargement of the shaft.

Thus, in FIGURE 2, regardless of the thickness of annular flanges 35 and 36, the sleeve 40 is not compressed by the center clamp 43 to such an extent as to make it wrinkle or buckle in a manner to permit fluid leakage along the shaft. Collar 45 may be of sufficient thickness to run with very slight clearance within sleeve 40 whereby only a correspondingly slight contraction of the sleeve is necessary to effect a seal against this collar. This form of construction is of advantage on very large or very small shafts where it may be difficult to clamp the sleeve directly on the surface of the shaft, as shown in FIGURE 1.

Having now described my invention and in what manner the same may be used, what I claim as new and desire to protect by Letters Patent is:

An auxiliary seal for a machine shaft extending through a bearing housing and a seal chamber for a running seal, said auxiliary seal comprising a radial flange on one end of said bearing housing, an annular flange on said radial flange closely surrounding said shaft, a radial flange on one end of said seal chamber, an annular flange on said radial flange closely surrounding said shaft in spaced relation to said annular flange on said radial bearing housing flange, a plurality of longitudinal struts on said seal chamber radial flange connected with a mounting ring bolted to said bearing housing radial flange, a resilient sleeve closely surrounding a portion of said shaft between said radial flanges and mounted at its ends on said annular flanges, and a clamp on an intermediate portion of said sleeve arranged to contract said sleeve into sealing engagement with said shaft.

References Cited in the file of this patent

UNITED STATES PATENTS

| | | |
|---|---|---|
| 2,285,974 | Huber | June 9, 1942 |
| 2,300,385 | Kollberg | Oct. 27, 1942 |
| 2,413,671 | Wolf et al. | Dec. 31, 1946 |
| 2,441,206 | Pevney | May 11, 1948 |
| 2,640,675 | Farris | June 2, 1953 |
| 2,761,709 | Gilbert | Sept. 4, 1956 |
| 2,841,442 | Badger | July 1, 1958 |